US012600246B2

(12) United States Patent (10) Patent No.: US 12,600,246 B2

Shammami et al. (45) Date of Patent: Apr. 14, 2026

(54) ADJUSTABLE THERMAL MID-BEAM MEMBER FOR SEPARATING BATTERY CELL ROWS IN A BATTERY ASSEMBLY

(71) Applicant: GM Global Technology Operations LLC, Detroit, MI (US)

(72) Inventors: Pauline Shammami, Royal Oak, MI (US); Matthew Simonin, Ortonville, MI (US); Ryan J. Prescott, Burton, MI (US); Qaiser Khan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 322 days.

(21) Appl. No.: 18/543,160

(22) Filed: Dec. 18, 2023

(65) Prior Publication Data

US 2025/0196663 A1     Jun. 19, 2025

(51) Int. Cl.

| | |
|---|---|
| *B60L 50/64* | (2019.01) |
| *H01M 50/209* | (2021.01) |
| *H01M 50/249* | (2021.01) |
| *H01M 50/291* | (2021.01) |

(52) U.S. Cl.
CPC ........... *B60L 50/64* (2019.02); *H01M 50/209* (2021.01); *H01M 50/249* (2021.01); *H01M 50/291* (2021.01); *H01M 2220/20* (2013.01)

(58) Field of Classification Search
CPC ...................................................... B60L 50/64
See application file for complete search history.

(56) References Cited

U.S. PATENT DOCUMENTS

| | | | | |
|---|---|---|---|---|
| 2018/0108891 A1* | 4/2018 | Fees | ......................... | B60L 50/66 |
| 2018/0287227 A1* | 10/2018 | Jeong | ...................... | B60L 58/25 |
| 2019/0157635 A1* | 5/2019 | Miler | .................... | H01M 50/30 |
| 2021/0129684 A1* | 5/2021 | Wuensche | ......... | H01M 10/6557 |
| 2022/0069405 A1* | 3/2022 | Choi | ................... | H01M 50/207 |
| 2022/0181730 A1* | 6/2022 | Sun | ...................... | H01M 50/131 |
| 2022/0209325 A1* | 6/2022 | Jung | .................. | H01M 50/367 |
| 2022/0352591 A1* | 11/2022 | Chi | ..................... | H01M 50/264 |

(Continued)

FOREIGN PATENT DOCUMENTS

| | | |
|---|---|---|
| DE | 102021120215 A1 | 2/2023 |
| EP | 4180262 A1 | 5/2023 |
| WO | 2024198178 A1 | 10/2024 |

OTHER PUBLICATIONS

German Office Action for German Application No. 102024103066.6; dated Mar. 3, 2025; 4 pages.

*Primary Examiner* — Brian L Swenson

(74) *Attorney, Agent, or Firm* — CANTOR COLBURN LLP

(57) ABSTRACT

A battery assembly includes a housing having a base wall, a first end wall, a first side wall, and a second side wall. A plurality of battery cells is arranged in the housing. The plurality of battery cells includes a first plurality of battery cells arranged in a first row and a second plurality of battery cells arranged in a second row. A mid-beam member is arranged between the first row and the second row. The mid-beam member includes a first mid-beam element and a second mid-beam element. The first mid-beam element includes a first end having a first flange. The second mid-beam element includes a first end portion having a second flange. The mid-beam member includes a passage defined between the first mid-beam element and the second mid-beam element.

20 Claims, 4 Drawing Sheets

(56) References Cited

U.S. PATENT DOCUMENTS

| | | | |
|---|---|---|---|
| 2023/0387553 A1* | 11/2023 | Caulk ................. | H01M 50/505 |
| 2024/0001992 A1* | 1/2024 | Lee .................... | H01M 50/209 |
| 2024/0079711 A1* | 3/2024 | Maguire ............. | H01M 50/271 |

* cited by examiner

ADJUSTABLE THERMAL MID-BEAM MEMBER FOR SEPARATING BATTERY CELL ROWS IN A BATTERY ASSEMBLY

INTRODUCTION

The subject disclosure relates to the art of battery assemblies and, more particularly, to an adjustable thermal mid-beam member for separating battery cell rows in a battery assembly that may be used in a vehicle.

Many newer vehicles are being manufactured with electric propulsion systems. The electric propulsion system, be it a full electric system or a hybrid electric system, relies on an electric motor that is powered by energy stored in a rechargeable energy storage system (RESS) or battery assembly. The battery assembly receives, stores, and discharges electric energy into a load, such as a drive unit that provides motive force to the vehicle.

The battery assembly typically includes a plurality of cells that store and discharge the electric energy. In some cases the plurality of cells are arranged in multiple banks or rows of cells. For example, two rows of cells may be arranged in a housing and connected to the drive unit. The housing provides protection for the battery cells and also supports electrical connectors that facilitate connection to the drive unit and charging devices.

In many cases, the two rows of cells are separated by a central wall. In addition to providing structural support for the plurality of cells, the central wall may also support cooling mechanisms that facilitate heat removal from the plurality of cells. The central wall together with the cooling mechanism includes a relatively thick cross section that reduces usable volume in the housing. Creating additional volume in the housing that could be used for additional cells or battery components would enhance battery efficiency. Accordingly, it is desirable to provide a central member in a battery housing that provides both structural support and heat removal properties without having a large cross-sectional footprint.

SUMMARY

A battery assembly, in accordance with a non-limiting example, includes a housing having a plurality of walls including a base wall, a first end wall, a second end wall opposite the first end wall, a first side wall, and a second side wall opposite the first side wall. The first side wall and the second side wall extend between and connect the first end wall and the second end wall. The plurality of walls define a battery cell receiving zone. A plurality of battery cells is arranged in the battery cell receiving zone. The plurality of battery cells includes a first plurality of battery cells arranged in a first row and a second plurality of battery cells arranged in a second row. The first row and the second row extend between the first end wall and the second end wall. A mid-beam member is arranged between the first row and the second row. The mid-beam member includes a first mid-beam element and a second mid-beam element. The first mid-beam element includes a first end arranged at the base wall, a second end and a first intermediate portion. The first end includes a first flange that extends toward the first side wall. The second mid-beam element includes a first end portion arranged at the base wall, a second end portion joined with the second end of the first mid-beam element, and a second intermediate portion. The first end portion includes a second flange that extends toward the second side wall. The mid-beam member includes a passage that extends between the first end wall and the second end wall. The passage is defined between the first intermediate portion and the second intermediate portion.

In addition to one or more of the features described herein the mid-beam member includes a first terminal end arranged at the first end wall, a second terminal end arranged at the second end wall, the passage extending between the first terminal end and the second terminal end.

In addition to one or more of the features described herein the passage includes an outlet at the first terminal end.

In addition to one or more of the features described herein the first end wall includes an opening fluidically connected with the outlet.

In addition to one or more of the features described herein the mid-beam member includes a first flange member arranged at the first terminal end and a second flange member arranged at the second terminal end, the first flange member being arranged at the first end wall and the second flange member being arranged at the second end wall.

In addition to one or more of the features described herein the first flange member is joined to the housing through the first end wall.

In addition to one or more of the features described herein the first flange member includes a first flange portion extending from the first mid-beam element toward the first side wall and a second flange portion extending from the second mid-beam element toward the second side wall.

In addition to one or more of the features described herein the second flange member includes a first flange element extending from the first mid-beam element toward the first side wall and a second flange element extending from the second mid-beam element toward the second side wall.

In addition to one or more of the features described herein the first end of the first mid-beam element is joined to the first end portion of the second mid-beam element, and the second end of the first mid-beam element is joined to the second end portion of the second mid-beam element.

In addition to one or more of the features described herein the first end of the first mid-beam element is welded to the first end portion of the second mid-beam element and the second end of the first mid-beam element is welded to the second end portion of the second mid-beam element.

A vehicle, in accordance with a non-limiting example, includes a body, an electric drive unit supported in the body, and a battery assembly supported in the body and operationally connected to the electric drive unit. The battery assembly includes a housing having a plurality of walls including a base wall, a first end wall, a second end wall opposite the first end wall, a first side wall, and a second side wall opposite the first side wall. The first side wall and the second side wall extend between and connect the first end wall and the second end wall. The plurality of walls define a battery cell receiving zone. A plurality of battery cells is arranged in the battery cell receiving zone. The plurality of battery cells includes a first plurality of battery cells arranged in a first row and a second plurality of battery cells arranged in a second row. The first row and the second row extend between the first end wall and the second end wall. A mid-beam member is arranged between the first row and the second row. The mid-beam member includes a first mid-beam element and a second mid-beam element. The first mid-beam element includes a first end arranged at the base wall, a second end and a first intermediate portion. The first end includes a first flange that extends toward the first side wall. The second mid-beam element includes a first end portion arranged at the base wall, a second end portion joined with the second end of the first mid-beam element, and a second intermediate portion. The first end portion includes a second flange that extends toward the second side wall. The mid-beam member includes a passage that extends between the first end wall and the second end wall. The passage is defined between the first intermediate portion and the second intermediate portion.

In addition to one or more of the features described herein the mid-beam member includes a first terminal end arranged at the first end wall, a second terminal end arranged at the second end wall, the passage extending between the first terminal end and the second terminal end.

In addition to one or more of the features described herein the passage includes an outlet at the first terminal end.

In addition to one or more of the features described herein the first end wall includes an opening fluidically connected with the outlet.

In addition to one or more of the features described herein the mid-beam member includes a first flange member arranged at the first terminal end and a second flange member arranged at the second terminal end, the first flange member being arranged at the first end wall and the second flange member being arranged at the second end wall.

In addition to one or more of the features described herein the first flange member is joined to the housing through the first end wall.

In addition to one or more of the features described herein the first flange member includes a first flange portion extending from the first mid-beam element toward the first side wall and a second flange portion extending from the second mid-beam element toward the second side wall.

In addition to one or more of the features described herein the second flange member includes a first flange element extending from the first mid-beam element toward the first side wall and a second flange element extending from the second mid-beam element toward the second side wall.

In addition to one or more of the features described herein the first end of the first mid-beam element is joined to the first end portion of the second mid-beam element, and the second end of the first mid-beam element is joined to the second end portion of the second mid-beam element.

In addition to one or more of the features described herein the first end of the first mid-beam element is welded to the first end portion of the second mid-beam element and the second end of the first mid-beam element is welded to the second end portion of the second mid-beam element.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
FIG. 1 is a left side view of a vehicle including a battery assembly provided with a mid-beam member, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. A steering control 30 is arranged between seats 23 and dashboard 26. Steering control 30 is operated to control orientation of select ones of the plurality of wheels 16. Vehicle 10 includes an electrical load shown in the form of an electric drive unit 34. Electric drive unit 34 provides power to one or more of the plurality of wheels 16.

A rechargeable energy storage system (RESS) or battery assembly 38 is arranged in body 12 and provides power to electric drive unit 34. In other arrangements, a fuel cell may be used to provide power to electric drive unit 34. At this point, it should be understood that the location of electric drive unit 34 and battery assembly 38 may vary. In a non-limiting example shown in FIG. 2, RESS 38 includes a housing 42 having a plurality of walls 44 that collectively define a battery cell receiving zone 48. At this point it should be understood that while battery assembly 38 is shown in connection with vehicle 10, the non-limiting examples described herein may be employed in battery assemblies used in a wide range of applications and should not be considered as being limited to vehicle power systems.

In a non-limiting example, the plurality of walls 44 include at least a base wall 50, a first end wall 52, a second end wall 54, a first side wall 56, and a second side wall 58. Housing 42 encloses a plurality of battery cells 60. The plurality of battery cells 60 includes a first plurality of battery cells 62 arranged in a first row 64 and a second plurality of battery cells 66 arranged in a second row 68. First row 64 and second row 68 extend between first end wall 52 and second end wall 54. The plurality of battery cells 60 are connected to a plurality electrical connectors 70 that interface with electric drive unit 34 and/or an external charging system (not shown).

First row 64 includes a first lateral side 93 positioned adjacent to first side wall 56 and a second lateral side 95. Second row 68 includes a first lateral side portion 98 positioned adjacent to second lateral side 95 and a second lateral side portion 100 that is arranged adjacent to second side wall 58. In a non-limiting example, a mid-beam member 110 is arranged between first row 64 and second row 68. That is, second lateral side 95 of first row 64 is arranged adjacent to and in contact with mid-beam member 110. Similarly, first lateral side portion 98 of second row 68 is arranged adjacent to and in contact with mid-beam member 110. As will be detailed herein, mid-beam member 110 not only serves as a central structural support for the plurality of battery cells 60 but also as a thermal pathway that carries heat from battery cell receiving zone 48 to ambient.

Figure 3:
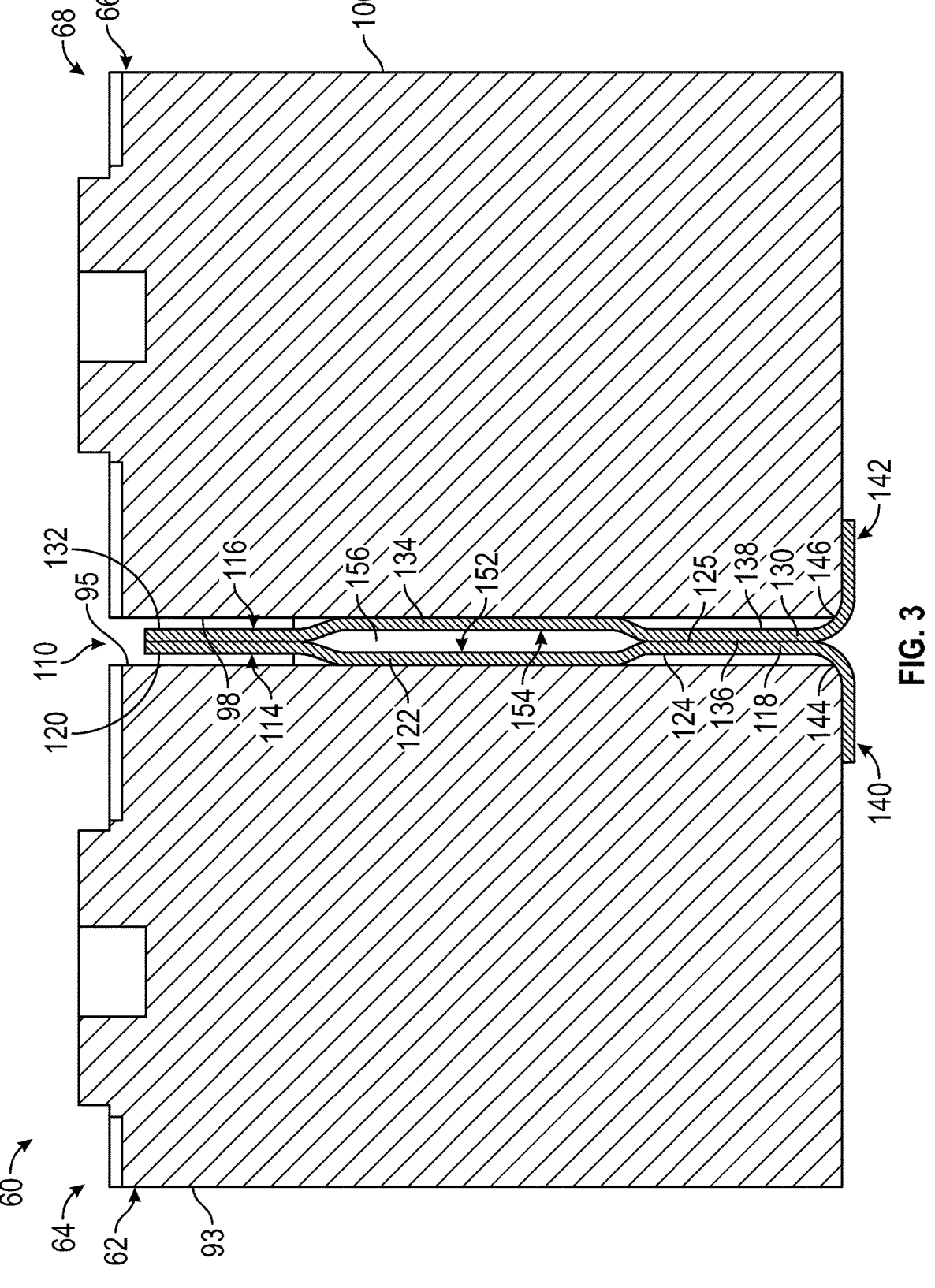
FIG. 3 is a cross-sectional front view of the first row of battery cells, the second row of battery cells, and the mid-beam member, in accordance with a non-limiting example.
Figure 5:
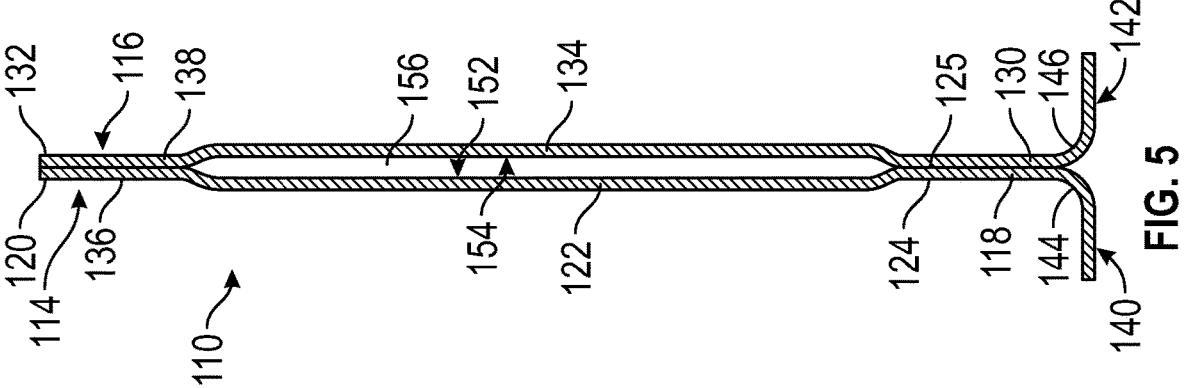
FIG. 5 is a cross-sectional front view of the mid-beam member taken through the line 5-5 of FIG. 4, in accordance with a non-limiting example.
Figure 4:
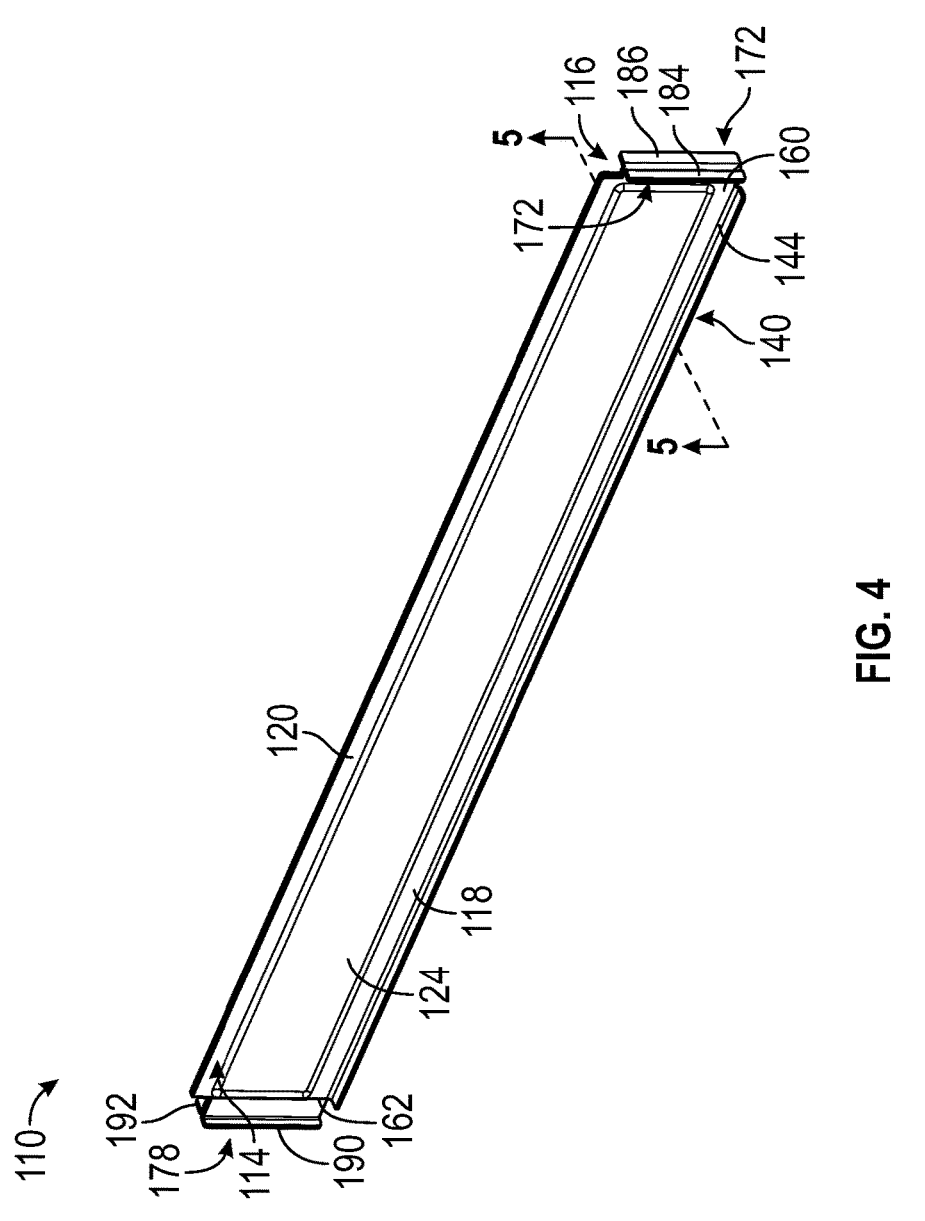
FIG. 4 is a left partial perspective view of the mid-beam member in accordance with a non-limiting example.

Reference will now follow to FIGS. 3, 4 and 5 in describing mid-beam member 110 in accordance with a non-limiting example. Mid-beam member 110 includes a first mid-beam element 114 and a second mid-beam element 116. First mid-beam element 114 is arranged alongside second mid-beam element 116. First mid-beam element 114 and second mid-beam element 116 may be formed from a single piece of material or, as in the non-limiting example shown, from two separate elements that may be joined one, to another, through for example various material dependent joining techniques.

In accordance with a non-limiting example, first mid-beam element 114 includes a first end 118, a second end 120, and a first intermediate portion 122. First mid-beam element 114 is also shown to include a first side 124 and a second side 125. Second side 125 is opposite first side 124. Second mid-beam element 116 includes a first end portion 130, a second end portion 132, and a second intermediate portion 134. Second flange element 116 is also shown to include a first side portion 136 and a second side portion 138. Second side portion 138 is opposite first side portion 136.

In a non-limiting example, first end 118 of first mid-beam element 114 includes a first flange 140 that extends from first side 124 towards first side wall 56 and first end portion 130 of second mid-beam element 116 includes a second flange 142 that extends from second side portion 138 toward second side wall 58. First flange 140 includes a first radius 144 and second flange 142 includes a second radius 146. First radius 144 is configured to accommodate second lateral side 95 of each of the plurality of battery cells 62 that form first row 64 and second radius 146 is configured to accommodate first lateral side portion 98 of the plurality of battery cells 66 that form second row 68. First mid-beam element 114 includes a first recess portion 152 formed in second side 125 and second mid-beam element 116 includes a second recess portion 154 formed in first side portion 136. When first mid-beam element 114 and second mid-beam element 116 are brought together, first recess portion 152 and second recess portion 154 form a passage 156.

Figure 2:
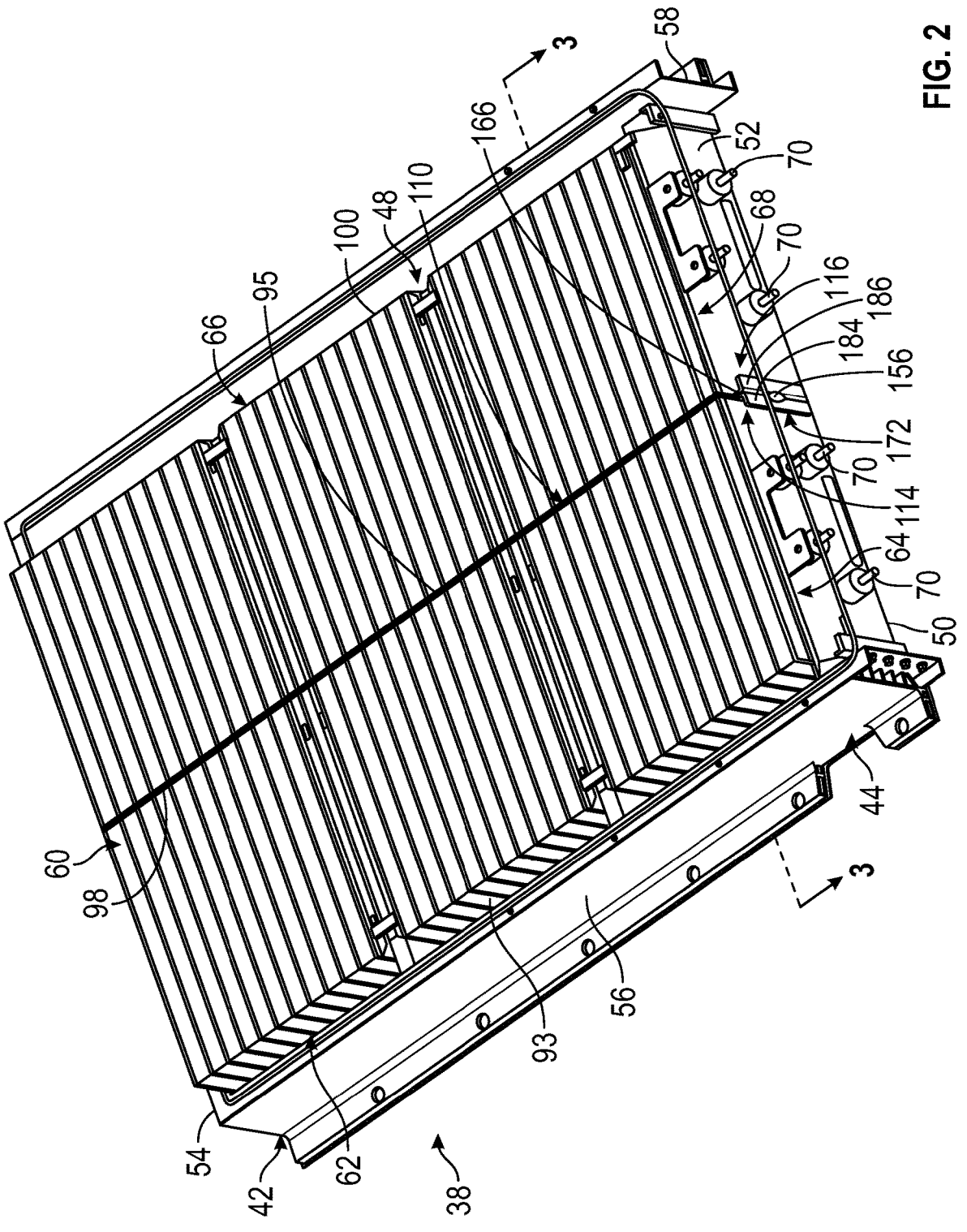
FIG. 2 is a left partial perspective view of a battery assembly including a first row of battery cells and a second row of battery cells separated by a mid-beam member, in accordance with a non-limiting example.

In a non-limiting example shown in FIG. 4, mid-beam member 110 includes a first terminal end 160 and a second terminal end 162. Second terminal end 162 is arranged opposite of first terminal end 160. Passage 156 extends between first terminal end 160 and second terminal end 162. In a non-limiting example, first terminal end 160 is arranged at first end wall 52 and second terminal end 162 is arranged at second end wall 54 as shown in FIG. 2. First end wall 52 includes a first outlet 166 that exposes passage 156 at first terminal end 160 and second end wall 54 may include a second outlet (not shown) that exposes passage 156 at second terminal end 162. With this arrangement, ambient air currents mor other fluids may flow through passage 156 to transport heat away from battery assembly 38.

In a non-limiting example, mid-beam member 110 includes a first flange member 172 arranged at first terminal end 160 and a second flange member 178 arranged at second terminal end 162. First flange member 172 interfaces with first end wall 52 and second flange member 178 interfaces with second end wall 54 to support mid-beam member 110 in battery receiving zone 48 and provide structural support for first row 64 and second row 68 of the plurality of battery cells 60.

In a non-limiting example, first flange member 172 includes a first flange portion 184 extending from first mid-beam element 114 toward first side wall 56 of housing 42 and a second flange portion 186 that extends from second mid-beam element 116 toward second side wall 58 of housing 42. Similarly, second flange member 178 includes a first flange element 190 that extends from first mid-beam member 114 toward first side wall 56 and a second flange element 192 that extends from second mid-beam element 116 toward second side wall 58.

In a non-limiting example, mid-beam member 110 is formed from any structurally supportive material including composites, plastics, metals, and the like. Depending on design constraints, mid-beam member 110 may be formed from a non-electrically conductive material, an electrically conductive material, or an electrically conductive material having an electrically insulating coating. In addition to being structurally supportive, mid-beam member may transfer heat from each of the plurality of battery cells in the first row and in the second row into the passage to be dissipated to ambient. The size of the passage may be tailored to enhance structural and heat dissipation performance, meet design metrics including available space in battery cell receiving zone, and accommodate the desired amount of heat dissipation including the mitigation of a thermal runaway condition.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery assembly comprising:
   a housing having a plurality of walls including a base wall, a first end wall, a second end wall opposite the first end wall, a first side wall, and a second side wall opposite the first side wall, the first side wall and the second side wall extending between and connecting the first end wall and the second end wall, the plurality of walls defining a battery cell receiving zone;
   a plurality of battery cells arranged in the battery cell receiving zone, the plurality of battery cells including a first plurality of battery cells arranged in a first row and a second plurality of battery cells arranged in a second row, the first row and the second row extending between the first end wall and the second end wall; and a mid-beam member arranged between the first row and the second row, the mid-beam member including a first mid-beam element and a second mid-beam element, the first mid-beam element including a first end arranged at the base wall, a second end and a first intermediate portion, the first end includes a first flange that extends toward the first side wall, the second mid-beam element includes a first end portion arranged at the base wall, a second end portion joined with the second end of the first mid-beam element, and a second intermediate portion, the first end portion including a second flange that extends toward the second side wall, the mid-beam member including a passage that extends between the first end wall and the second end wall defined between the first intermediate portion and the second intermediate portion.

2. The battery assembly according to claim 1, wherein the mid-beam member includes a first terminal end arranged at the first end wall, a second terminal end arranged at the second end wall, the passage extending between the first terminal end and the second terminal end.

3. The battery assembly according to claim 2, wherein the passage includes an outlet at the first terminal end.

4. The battery assembly according to claim 3, wherein the first end wall includes an opening fluidically connected with the outlet.

5. The battery assembly according to claim 2, wherein the mid-beam member includes a first flange member arranged at the first terminal end and a second flange member arranged at the second terminal end, the first flange member being arranged at the first end wall and the second flange member being arranged at the second end wall.

6. The battery assembly according to claim 5, wherein the first flange member is joined to the housing through the first end wall.

7. The battery assembly according to claim 5, wherein the first flange member includes a first flange portion extending from the first mid-beam element toward the first side wall and a second flange portion extending from the second mid-beam element toward the second side wall.

8. The battery assembly according to claim 6, wherein the second flange member includes a first flange element extending from the first mid-beam element toward the first side wall and a second flange element extending from the second mid-beam element toward the second side wall.

9. The battery assembly according to claim 1, wherein the first end of the first mid-beam element is joined to the first end portion of the second mid-beam element, and the second end of the first mid-beam element is joined to the second end portion of the second mid-beam element.

10. The battery assembly according to claim 9, wherein the first end of the first mid-beam element is welded to the first end portion of the second mid-beam element and the second end of the first mid-beam element is welded to the second end portion of the second mid-beam element.

11. A vehicle comprising:

a body;

an electric drive unit supported in the body; and a battery assembly supported in the body and operationally connected to the electric drive unit, the battery assembly comprising:

a housing having a plurality of walls including a base wall, a first end wall, a second end wall opposite the first end wall, a first side wall, and a second side wall opposite the first side wall, the first side wall and the second side wall extending between and connecting the first end wall and the second end wall, the plurality of walls defining a battery cell receiving zone;

a plurality of battery cells arranged in the battery cell receiving zone, the plurality of battery cells including a first plurality of battery cells arranged in a first row and a second plurality of battery cells arranged in a second row, the first row and the second row extending between the first end wall and the second end wall; and a mid-beam member arranged between the first row and the second row, the mid-beam member including a first mid-beam element and a second mid-beam element, the first mid-beam element including a first end arranged at the base wall, a second end and a first intermediate portion, the first end includes a first flange that extends toward the first side wall, the second mid-beam element includes a first end portion arranged at the base wall, a second end portion joined with the second end of the first mid-beam element, and a second intermediate portion, the first end portion including a second flange that extends toward the second side wall, the mid-beam member including a passage that extends between the first end wall and the second end wall defined between the first intermediate portion and the second intermediate portion.

12. The vehicle according to claim 11, wherein the mid-beam member includes a first terminal end arranged at the first end wall, a second terminal end arranged at the second end wall, the passage extending between the first terminal end and the second terminal end.

13. The vehicle according to claim 12, wherein the passage includes an outlet at the first terminal end.

14. The vehicle according to claim 13, wherein the first end wall includes an opening fluidically connected with the outlet.

15. The vehicle according to claim 12, wherein the mid-beam member includes a first flange member arranged at the first terminal end and a second flange member arranged at the second terminal end, the first flange member being arranged at the first end wall and the second flange member being arranged at the second end wall.

16. The vehicle according to claim 15, wherein the first flange member is joined to the housing through the first end wall.

17. The vehicle according to claim 15, wherein the first flange member includes a first flange portion extending from the first mid-beam element toward the first side wall and a second flange portion extending from the second mid-beam element toward the second side wall.

18. The vehicle according to claim 16, wherein the second flange member includes a first flange element extending from the first mid-beam element toward the first side wall and a second flange element extending from the second mid-beam element toward the second side wall.

19. The vehicle according to claim 11, wherein the first end of the first mid-beam element is joined to the first end portion of the second mid-beam element, and the second end of the first mid-beam element is joined to the second end portion of the second mid-beam element.

20. The vehicle according to claim 19, wherein the first end of the first mid-beam element is welded to the first end portion of the second mid-beam element and the second end of the first mid-beam element is welded to the second end portion of the second mid-beam element.

* * * * *